United States Patent
Wang

(10) Patent No.: US 11,470,656 B2
(45) Date of Patent: Oct. 11, 2022

(54) WI-FI MANAGEMENT IN THE PRESENCE OF HIGH PRIORITY RECEIVERS

(71) Applicant: Juniper Networks, Inc., Sunnyvale, CA (US)

(72) Inventor: Wenfeng Wang, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/832,560

(22) Filed: Mar. 27, 2020

(65) Prior Publication Data
US 2021/0307084 A1    Sep. 30, 2021

(51) Int. Cl.
| | |
|---|---|
| H04W 16/14 | (2009.01) |
| H04W 74/08 | (2009.01) |
| H04B 17/318 | (2015.01) |
| H04W 4/029 | (2018.01) |
| H04W 24/10 | (2009.01) |
| H04W 64/00 | (2009.01) |
| H04W 88/06 | (2009.01) |

(52) U.S. Cl.
CPC ...... *H04W 74/0875* (2013.01); *H04B 17/318* (2015.01); *H04W 4/029* (2018.02); *H04W 16/14* (2013.01); *H04W 24/10* (2013.01); *H04W 64/003* (2013.01); *H04W 88/06* (2013.01)

(58) Field of Classification Search
CPC . H04W 72/1247; H04W 16/14; H04W 28/22; H04W 72/00; H04W 72/0406; H04W 72/082; H04W 72/10; H04W 84/18; H04W 16/32; H04W 72/0446; H04W 72/1226; H04W 74/0816; H04W 76/11; H04W 76/14; H04W 76/50; H04W 88/085

USPC ....... 370/328, 280, 347, 277, 208, 335, 465, 370/345, 480, 341, 437, 252; 455/561, 455/296, 63.1, 436, 445, 452.1, 453, 406, 455/456.1

See application file for complete search history.

(56) References Cited

U.S. PATENT DOCUMENTS

| | | | | |
|---|---|---|---|---|
| 9,838,882 | B1 * | 12/2017 | Yankevich | H04K 3/226 |
| 2002/0186167 | A1 * | 12/2002 | Anderson | G01S 5/06 342/465 |
| 2016/0337868 | A1 | 11/2016 | Kenney et al. | |
| 2017/0156149 | A1 * | 6/2017 | Lin | H04K 3/226 |

(Continued)

OTHER PUBLICATIONS

"European Application Serial No. 20182675.7, Partial European Search Report dated Nov. 23, 2020", 17 pgs.

(Continued)

*Primary Examiner* — Joseph Arevalo
(74) *Attorney, Agent, or Firm* — Shumaker & Sieffert, P.A.

(57) ABSTRACT

The disclosed embodiments provide for management of a Wi-Fi network in the presence of a high priority receiver. When a high priory receiver is identified, a portion of the Wi-Fi network that could potentially interfere with the high priority receiver is identified and steps are taken to reduce the probability of such interference. For example, some wireless transmitters may be switched to alternate channels to reduce the probability of interference. By sharing information relating to high priority receivers across a plurality of wireless transmitters, the disclosed embodiments provide for more efficient operation in the presence of high priority receivers when compared to methods that independently detect a high priority receiver at each wireless transmitter.

13 Claims, 9 Drawing Sheets

(56) References Cited

U.S. PATENT DOCUMENTS

2017/0325106 A1* 11/2017 Goldsmith ............ H04W 24/02
2018/0359730 A1    12/2018 Jung et al.
2019/0342795 A1    11/2019 Mcfarland et al.
2019/0364492 A1*  11/2019 Azizi .................. H04W 68/005
2020/0064485 A1*   2/2020 Kotake .................. G01S 17/95
2021/0067300 A1*   3/2021 Pan ...................... H04B 17/309

OTHER PUBLICATIONS

Extended European Search Report dated Feb. 24, 2021 in counterpart EP Application No. 20182675.7, 14 pp.
Response to Extended Search Report dated Feb. 24, 2021, from counterpart European Application No. 20182675.7 filed Mar. 18, 2022, 27 pp.

* cited by examiner

WI-FI MANAGEMENT IN THE PRESENCE OF HIGH PRIORITY RECEIVERS

FIELD

The present disclosure relates generally to Wi-Fi communications. More specifically, the disclosure is directed to the conditional operation of Wi-Fi transmitters when a higher priority receiver (HPR), such as a weather radar, is detected within a vicinity.

BACKGROUND

The IEEE 802.11 WLAN standards specify a bandwidth of 22 MHz and channels are on a 5 MHz incremental step. Nominal figures for the channel bandwidth of 20 MHz are often given. The 20/22 MHz bandwidth and channel separation of 5 MHz means that adjacent channels overlap and signals on adjacent channels will interfere with each other.

The 5 GHz Wi-Fi bandwidth includes unlicensed industrial, scientific and medical (ISM) channels as well as numerous channels that fall outside the accepted ISM unlicensed band and, as a result, various restrictions are placed on operation at these frequencies. The main concern for using channels that fall outside the ISM unlicensed band is that the Wi-Fi equipment may interfere with operations of weather-radar and military applications (such as military radar and/or communications). To prevent interference, Wi-Fi equipment that operates in these frequencies must implement Dynamic Frequency Selection (DFS) capabilities on these channels. DFS is supported by the IEEE 802.11h wireless local area network standard. DFS is also mandated in the 5470-5725 MHz Unlicensed National Information Infrastructure (U-NII) band for radar avoidance DFS is a spectrum-sharing mechanism that allows wireless LANs (WLANs) to coexist with radar and other systems. A DFS system listens on a specific band for signal from, e.g., a radar system. If the DFS system detects a signal, the DFS system automatically selects a different frequency channel and examines the different frequency to see if there is any other equipment operating on it. The DFS system then selects and uses a 5 GHz frequency channel that does not interfere with any radar system.

DFS rules only apply to the frequency band between 5.250 and 5.725 GHz, which is the frequency band used by weather and military radars. It should be noted that DFS based systems are effective only when the incumbent system includes a transmitter that operates over the same frequency channel and as such announces the existence of a receiver on that frequency channel.

DETAILED DESCRIPTION

Figure 1:
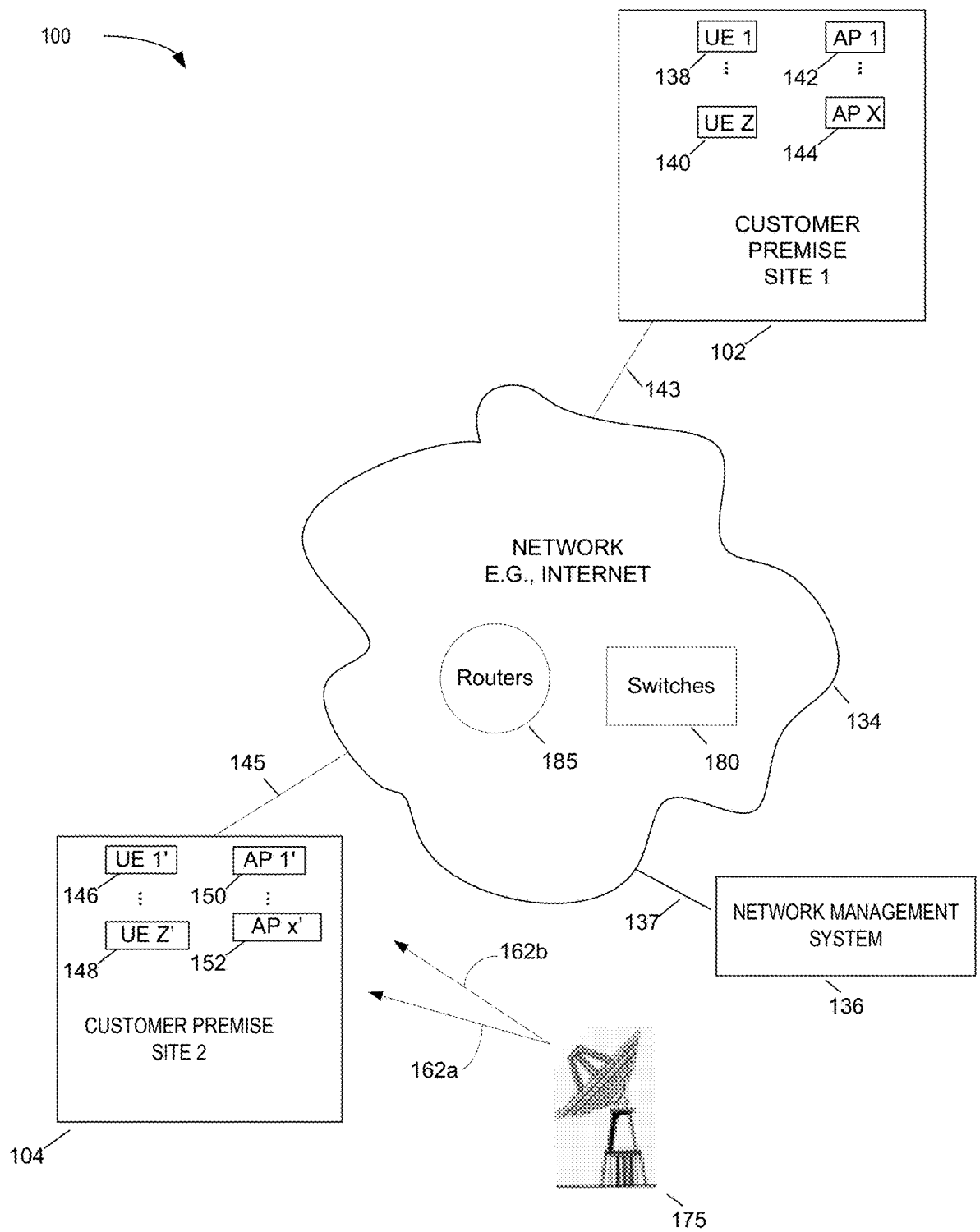
FIG. 1 shows an example system 100 implemented in accordance with at least one embodiment.

While the DFS ensures that receivers of high priority equipment are not affected by interference from Wi-Fi equipment, it does not address needs of the Wi-Fi network users. Specifically, an AP, in an effort to comply with 802.11h DFS, switches from a channel in use by a HPR to a second channel. In some circumstances, this second channel may also be in use by a HPR. After some time delay the HPR is detected on the second channel, the AP will switch from the second channel to a third channel. This process could, in some circumstances, repeat for even further channels. During this period of channel switching, performance of the AP experiences some level of impact, which can affect the user community in some circumstances. To avoid this degradation in performance, each AP detecting a HPR should perform fewer channel switches before identifying an available channel. Ideally, an AP could identify in advance which channels are available for use and which channels are utilized by high priority receivers.

This disclosure describes a method for maintaining high service level experience (SLE) for users of a Wi-Fi network in the presence of one or more higher priority device. These higher priority devices operate, in some embodiments, on a 5 GHz frequency band. Wi-Fi devices detecting these higher priority devices are required to avoid operations that can interfere with the higher priority devices. Ceasing interfering operations can include switching their operations to a different frequency channel on which the higher priority device is not operating.

To comply with the DFS regulations, when a first AP detects that it is potentially interfering with a higher priority receiver on a first communication channel, the first AP is required to switch its own operation from the first communication channel to a different, second communication channel. The first AP then adds the first communication channel to a "blacklist" that keeps track of channels the first AP is prohibited from operating on. Other APs which do not detect that they might interfere with the higher priority receiver can continue utilizing the first channel for communication. In some circumstances, the first AP determines that the higher priority receiver is not only utilizing a single channel, but is instead operating on an entire frequency band, such as an entire 5 Ghz frequency band. In this case, simply switching channels within the same band will not reduce the risk of interference with the higher priority receiver. Thus, in this situation, the first AP transitions away from use of the frequency band (e.g. 5 Ghz) and instead utilizes a completely different frequency band (e.g. 2.4 GHz frequency band).

Some of the disclosed embodiments construct a network connectivity graph. The graph is constructed based on signal strength information measured by each AP included in a Wi-Fi Network. The APs included in the Wi-Fi network forward the measured signal strength information to a network management system. The network management system also has information with respect to a geographic location of each AP reporting the signal strength information.

Based on the location information and signal strength information, the network management system is able to determine a network graph for the Wi-Fi network. Nodes in the network graph correspond, in some embodiments, to devices operating within the Wi-Fi network (e.g. wireless transmitters). Edges in the graph represent signal strengths between devices connected by the edge. In some embodiments, edges of a graph data structure are tagged with respective signal strength information and/or attenuation information. In some embodiments, if attenuation is above a threshold or otherwise meets certain criterion, the edge is not included in the network graph.

In some of the disclosed embodiments, when an AP included in the Wi-Fi network detects a high priority receiver, the AP sends a notification to a network management system. The network management system then relies on the network graph, discussed above, to identify other network devices that are at risk of interference with the high priority receiver. These identified other network devices are then instructed to modify their operation as appropriate to avoid interference with the high priority receiver.

In some embodiments, a network management system receiving a notification of a high priority receiver instructs all other network devices on the Wi-Fi network to avoid channels and/or frequencies upon which the HPR operation has been detected. This is accomplished, in some embodiments, by adding channel information describing where the HPR is operating to a blacklist maintained by a NMS. The NMS blacklist is used to determine Wi-FI channels that one or more APs operating on the Wi-Fi network should blacklist. By adding the HPR channel information to the global back list, proactive steps are taken to prevent interference with the HPR. This also avoids additional channel switching that could be required if other network devices within the wireless network were left to discover the HPR independently.

Some other embodiments determine to modify operation of a subset of network devices based on the detection of the HPR. In some of these embodiments, operation of one or more APs. Which AP's operation is modified is based on criterion. For example, one criterion considers attenuation of signals exchanged between a first AP and a second AP that detected the HPR. If the attenuation of these signals is relatively large (e.g. above a predetermined threshold), then it is not necessary to modify operation of the first AP, in at least some embodiments, as the AP is assumed to be far enough away from the HPR to prevent interference with operation of the HPR. If the attention of the signals exchanged between the two APs is below the predetermined threshold, operation of the first AP is modified, in these embodiments, to avoid transmission on channels upon which an HPR was detected by the second AP (in these embodiments). Some embodiments maintain device specific AP blacklists in addition to the NMS blacklist discussed above. To accomplish modified operation of a subset of the network devices, channel information relating to operation of the HPR is added to device specific blacklists for each device included in the subset.

Some embodiments estimate a HPR transmission signal strength at an AP via Equation 1 below:

$$\text{Estimated } SS_{HPR\,j} = SS_{HPR\,i} - \text{attenuation}_{i \to j} \qquad \text{Equ. 1}$$

where:
$SS_{HPR\,i}$ signal strength value detected by first $AP_i$ originating from a transmitter associated with HPR, estimated $SS_{HPR\,j}$ Estimated signal strength value that a second $AP_j$ may detect based on transmission originating from a transmitter associated with HPR,
attenuation$_{i \to j}$ Attenuation of Wi-Fi signal over a path from $AP_i$ to $AP_j$ In some embodiments, the network management system determines which APs should be notified of a HPR based on the whether an estimated signal strength at the said AP from a transmitter of the HPR is greater than a predetermined threshold.

$$\text{Estimated } RSSI_{HPR\,j} > \text{Threshold} \qquad \text{Equ. 2}$$

where:
estimated $SS_{HPR\,j}$—Estimated signal strength value that a second $AP_j$ would experience based on a transmission originating from a transmitter associated with an HPR,
Threshold—a predetermined threshold.

In some embodiments, the network management system notifies a set of APs within a predetermined proximity to the first AP about the operations of the HPR. For example, this set of APs are notified, in some embodiments, to avoid operations on any channels upon which HPR associated transmissions were detected. In some circumstances, the number of APs included in the set of APs is reduced based on a criterion. For example, in some embodiments, APs that are within a threshold distance of the HPR are not included in the set of APs if they are not also within a predetermined distance on the network graph of the first AP. These embodiments reduce a number of APs that switch to a channel in use by the HPR when the HPR is already known by the network management system.

Some embodiments rely on physical locations (geographic locations, e.g. coordinates) of network devices when determining which devices should be notified about an HPR operating in their proximity. Some embodiments utilize triangulation to obtain a position estimate of the HPR. In some embodiments, the triangulation is based on signal strength measurements received from two or more network devices. Once a location estimate of the HPR is determined, these embodiments provide a notification to network devices within a threshold distance of the HPR.

Some specific network topologies e.g., when the APs of the Wi-Fi network are located substantially on a straight line, affect how selection of network devices to notify is made. For example, when network devices are located along a substantially straight line, which APs are notified is determined after at least two APs have detected the HPR.

FIG. 1 shows an example system 100 implemented in accordance with at least one embodiment. System 100 includes a plurality of APs (AP 1 142, . . . , AP X 144, AP 1' 150, . . . , AP X' 152). In various embodiments, an AP is a wireless AP a router, a switch, or any other device capable of providing network access. The system 100 also includes a network management system (NMS) 136 (e.g., a NMS blacklist management system (server)). The NMS 136 is coupled to the network 134 via a connection 137. The network devices shown in FIG. 1 are in communication with each other via a digital network, such as the network 134, (e.g., the Internet and/or an enterprise intranet). The network 134 consists of numerous routers 185 and numerous switches 180. Network communications links 143 and 145 couple the APs (AP 1 142, AP X 144, AP 1' 150, AP X' 152) respectively, to network 134. The system 100 further includes a plurality of user equipment devices (UE 1 138, . . . , UE Z 140, UE 1' 146, . . . , UE Z' 148) wherein user equipment is any wired, wireless, or optical equipment providing network access to communication devices used by users such as people or automated devices such as IoT devices. Some of the UEs (138, 140, 146, 148) are wireless devices which may move throughout system 100.

In the example system 100, APs are located at different customer sites. Customer premise site 1 102, includes APs (AP 1 142, . . . , AP X 144). Customer premise site 2 104, includes APs (AP 1' 150, . . . , AP X' 152). As shown in FIG. 1, UEs (UE 1 138, . . . , UE Z 140) are currently located at customer premise site 1 102; UEs (UE 1' 146, . . . , UE Z' 148) are currently located at customer premise site 2 104. In some embodiments, each one of the servers, routers, switches, APs, UEs NMS, and other servers attached to the network optionally include a system log or an error log. Each one of these devices records the status of the device including normal operational status and error conditions in the error log.

An example HPR 175 associated with e.g., weather radar is shown in the vicinity of site 2 104. Some or all of the APs in site 104, AP 1' 150, AP X' 152, as well as the APs of site 102, AP1 142, AP X 144, are within the range to weather radar 175. The weather radar 175 is shown generating signals 162a and 162b.

The method described herein minimizes the number of times that APs associated with the system switch to frequency channel used by HPR, e.g., weather radar 175, detect the existence of HPR in their vicinity, and then switch again to a new frequency channel.

Figure 2:
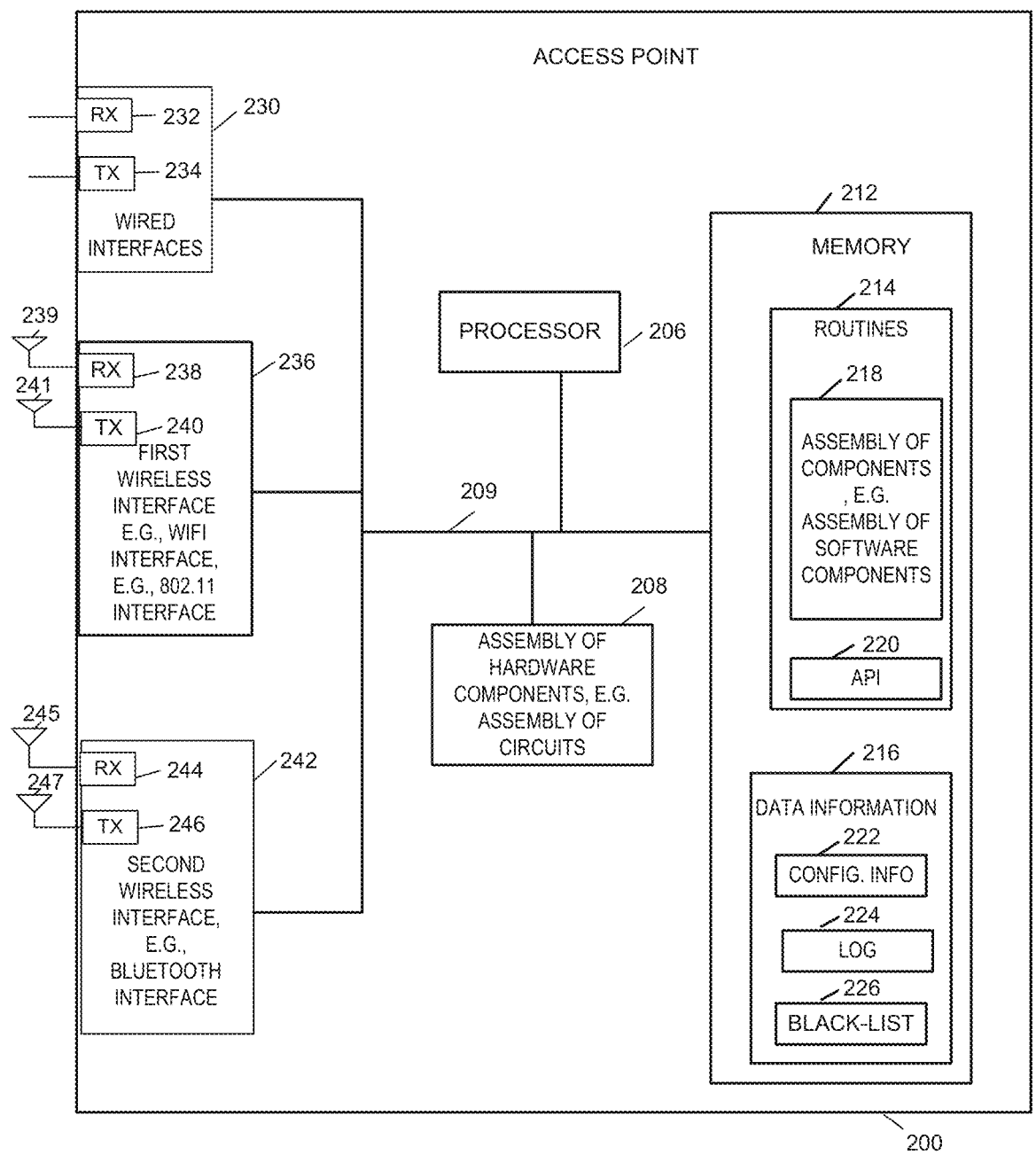
FIG. 2 is a block diagram of an example access point (AP).

FIG. 2 is a block diagram of an example AP 200 (e.g., any of APs AP 1 142, . . . , APX 144, AP 1' 150, APX' 152) in accordance with one or more of the disclosed embodiments. Various embodiments include one or more of the components discussed below with respect to AP 200 and FIG. 2. AP 200 includes wired interface 230, wireless interfaces 236, 242, a hardware processor 206, (e.g., a CPU or hardware processing circuitry), a memory 212, and an assembly of components 208, e.g., assembly of hardware components, e.g., assembly of circuits, coupled together via a bus 209 over which the various elements may interchange data and information. Wired interface 230 includes a receiver 232 and a transmitter 234. The wired interface 230 couples the AP 200 to a network (e.g. network 134 of FIG. 1). First wireless interface 236, e.g., a wireless Wi-Fi interface, e.g. 802.11 interface, includes a receiver 238 coupled to a receive antenna 239, via which the AP may receive wireless signals from communications devices, e.g., wireless terminals, and a transmitter 240 coupled to a transmit antenna 241 via which the AP may transmit wireless signals to communications devices, e.g., wireless terminals. Second wireless interface 242, e.g., a Bluetooth interface, includes receiver 244 coupled to receive antenna 245, via which the AP may receive wireless signals from communications devices, e.g., wireless terminals, and transmitter 246 is coupled to a transmit antenna 247. Via the transmit antenna 27, the AP transmits wireless signals to communications devices, e.g., wireless terminals.

Memory 212 includes routines 214 and data/information 216. Routines 214 include assembly of components 218, e.g., an assembly of software components, and an Application Programming Interface (API) 220. Data/information 216 includes configuration information 222, device status log including error events and normal events captured as messages in a system log or an error log 224 and a black-list 226 which identifies all of the 5 GHz channels on which higher priority devices such as weather radar, military communications, etc. have been previously discovered and should not be used.

Figure 3:
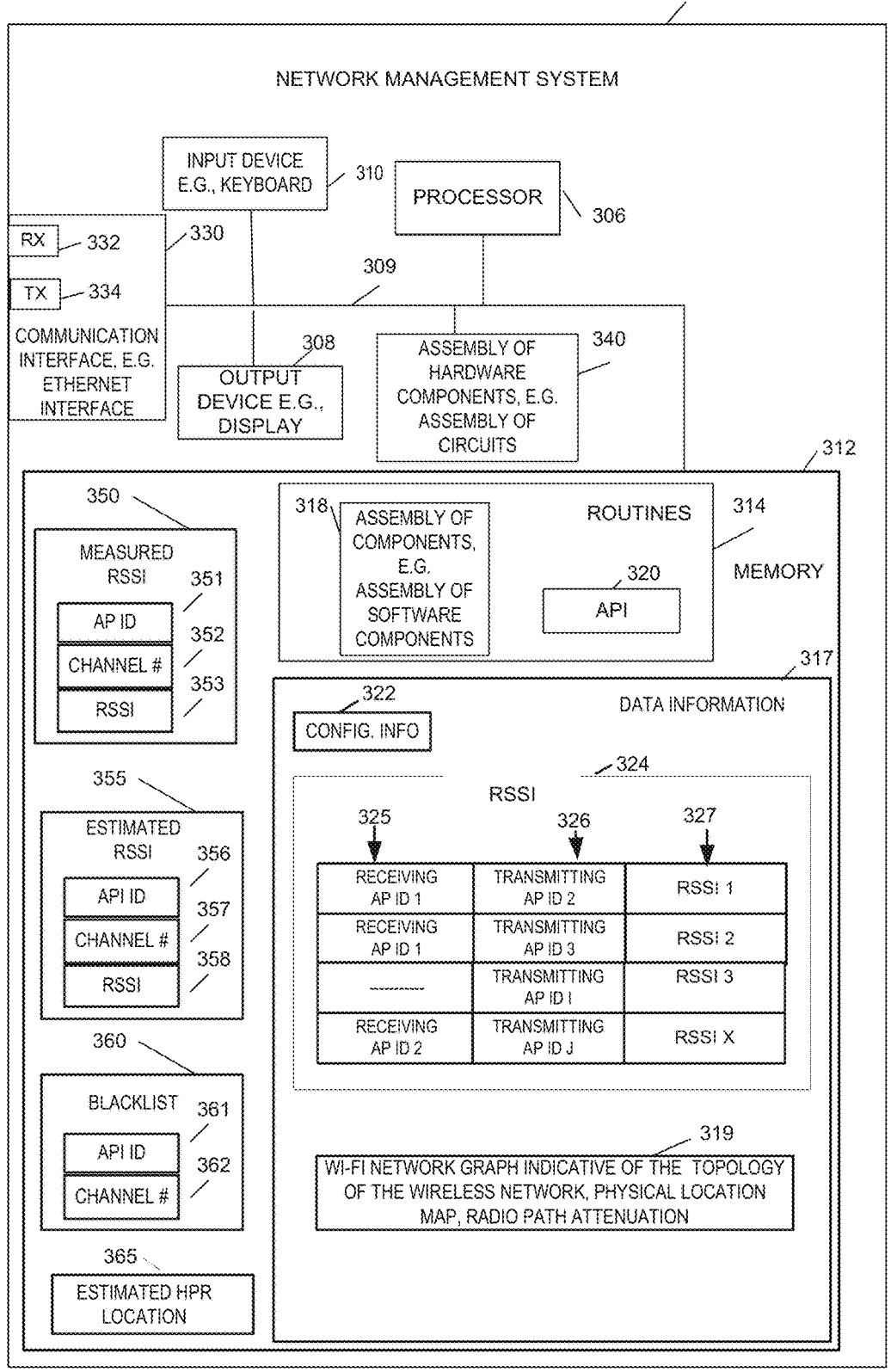
FIG. 3 is a block diagram of an example network management system.

FIG. 3 is a block diagram of an example network management system. The NMS 136, also discussed above with respect to FIG. 1, in some embodiments, is a network management node, e.g., a network management server such as automated network reconfiguration server. In some embodiments, network management system 136 of FIG. 3 is network management system (NMS) 136 of FIG. 1. In some embodiments the network management system 136 is integrated with an AP or other network device, such as any of the APs or devices shown in FIG. 1.

Various embodiments of a network management system include one or more of the components discussed below with respect to FIG. 3. The example network management system 136 includes a communications interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the network management system 136 to a network and/or the Internet. Communications interface 330 includes a receiver 332 via which the network monitoring apparatus can receive data and information, e.g., including service related information, e.g., message such as messages logged in a system log or an error log from a variety of devices such as AAA server, DHCP server, Web server (not shown in FIG. 1 for simplicity sake), routers, switches, and a transmitter 334, via which the network management system 136 can send data and information, e.g., including configuration information and instructions, e.g., instructions to APs, routers, switches, or any other server attached to the network, to restart, change operating parameters, download and install another SW version, etc.

Memory 312 includes routines 314 and data/information 317. Routines 314 includes an assembly of components 318 (e.g., an assembly of software components), and an Application Programming Interface 320 (API). Data/information 317 includes configuration information 322, recorded RSSI log 324 including RSSI from each one of the operational APs specifically, including ID of a receiving AP 325, ID of a transmitting AP 326, and RSSI received by the receiving AP from the transmitting AP 327. The memory 312 also includes Wi-Fi network graph indicative of the network topology 319. In some embodiments the network graph includes a map of physical deployment locations of APs, and/or an attenuation experienced over a radio path between AP pairs. For example, the table shows that AP ID 1 received a signal with RSSI 1 from AP ID2, signal with RSSI 2 from AP ID3, . . . , and AP ID 2 received signal with RSSI x from AP ID j. In general column 325 provides a list of the receiving APs, column 326 provides a list of the transmitting APs, and column 327 provides a list of the corresponding RSSI. This and other tables are provided for illustration only while other more efficient data structures may be used.

The memory 312 also includes a table of measured RSSIs 350 (only one data entry of the table is showed). Each data entry includes the ID 351 of a wireless device that detected a signal from a transmitter associated with an HPR, an RSSI value 353 of the detected signal from the transmitter associated with the HPR, e.g., weather radar 175 of FIG. 1, and a channel 352 in which the signal was detected.

The memory 312 also includes a table of estimated RSSIs 355 (only one data entry of the table is showed). Each data entry includes the ID of the AP 356, for which the system calculated the estimated RSSI signal from the transmitter associated with the HPR, e.g., weather radar 175 of FIG. 1, a channel 357 for which the estimated RSSI is calculated, and an estimated RSSI 358.

As explained above, the estimated RSSIs are calculated in some embodiments using Equation 1 and further based on an estimated attenuation between the AP which received the transmission over the specific channel and the said AP. In some embodiments, the estimated direction and/or estimated location 365 of the HPR is calculated using the physical map of the AP deployment. RSSI values received by APs originating from the transmitter associated with the HPR as also utilized when determining the estimated direction and/or estimated location 365.

In some embodiments, the estimated RSSIs 358 are compared against a predetermined threshold and if the system determines that the RSSI is greater than a predetermined threshold, the blacklist 360 of AP 361 is augmented by adding the channel 362 to the list of blacklisted channels of that AP. The network management system notifies the specific AP 361 of any modification to the blacklist associated with that AP.

In some embodiments, blacklist 360 includes a table of the blacklists associated with each AP (for sake of simplicity only one entry is provided in the figure). Each entry of the blacklist 360 includes the ID of the AP 361 and the channel 362 that should be added to the blacklist of that AP.

Figure 4:
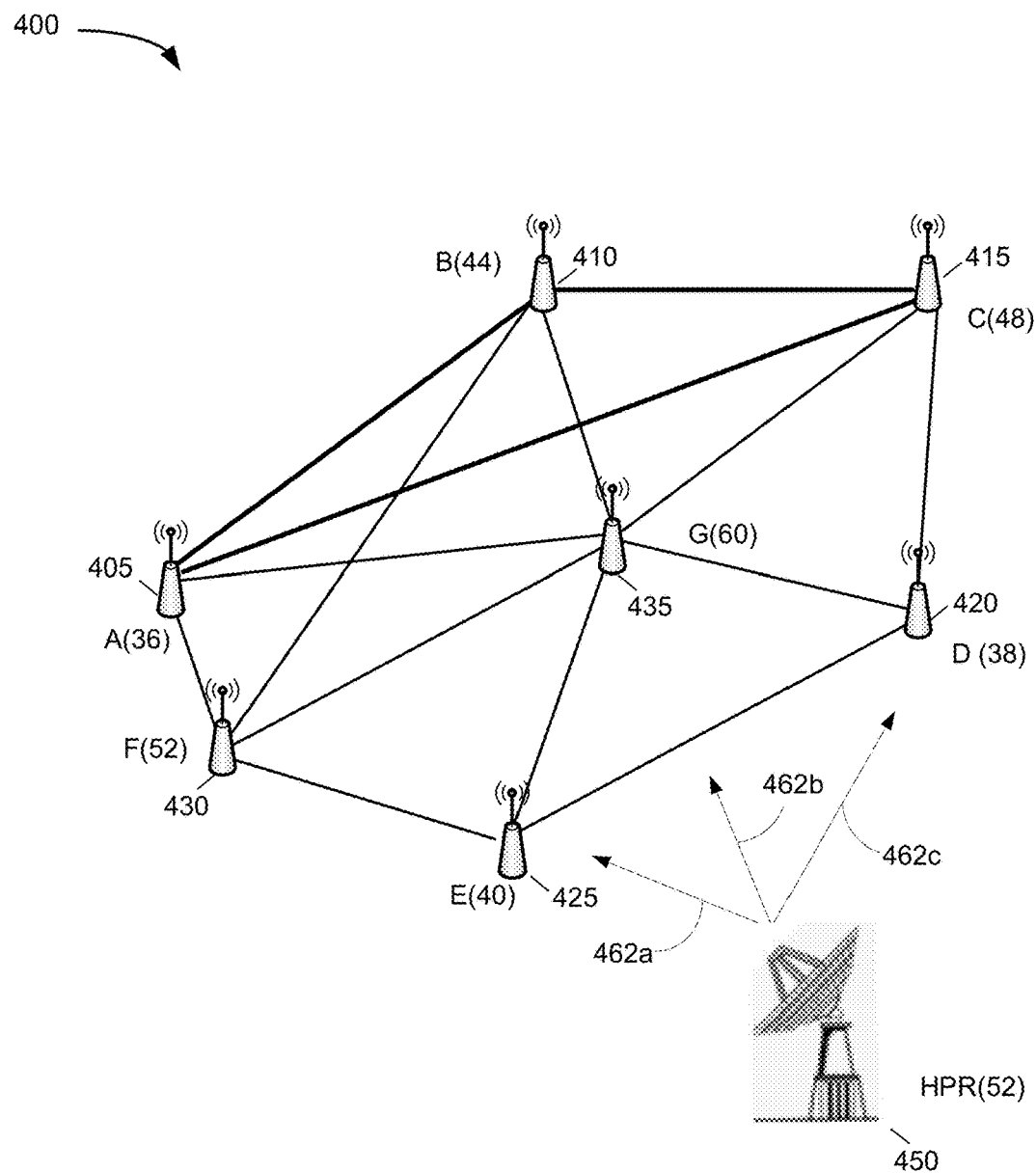
FIG. 4 shows an example network graph.

FIG. 4 shows an example network graph 400 of a network included in the system 100 discussed above with respect to FIG. 1. The illustrative network has nodes (e.g. APs) {A, B, C, D, E, F, and G}, labeled 405, 410, 415, 420, 425, 430, and 435 respectively. The nodes use Wi-Fi channels {36, 44, 48, 38, 40, 52, and 60} respectively. An HPR 450 operates on channel 52. The HPR 450 is shown generating signals 462a-462c.

Since the HPR 450 operates on channel 52, only AP 430, which also operates on channel 52, has detected HPR 450. In accordance with one embodiment, as soon as AP 430 notifies a network management system (e.g. NMS 136) of the existence of HPR on channel 52, the network management system notifies all of the APs in the network of the existence of the HPR on channel 52. In response to said notification, in some embodiments, each AP receiving the notification adds channel 52 to their respective blacklist.

In other embodiments, the network management system notifies devices determined to be peer neighbors of AP 430 of the HPR 450. In some embodiments, peer neighbors are those wireless devices whose signals are visible from the AP 430 (and/or those wireless devices with visibility to signals from the AP 430). In the example of FIG. 4, peer devices of AP 430 include APs 405, 410, 425, and 435. APs 415 and 420 are not peer neighbors given that the network graph 400 does not include a direct connection (edge) connecting AP 430 with either AP 415 or AP 420. In embodiments that only notify peer devices of the AP detecting the HPR 450, only the peer devices update their blacklists to include channel 52 (e.g. the set of channels utilized by the HPR). If APs 415 or 420 attempts to use channel 52, they may detect that HPR operates on that channel. If AP 420 detects HPR 450, the AP 420 would notify the network management system, which would propagate channel 52 to blacklists of the peer devices of AP 420 and may forward it also to AP 420. Some embodiments extend this embodiment to a broader notification that includes not only peer devices but also peer devices of the peer devices. Some embodiments may further extend this embodiment to peer devices of peer devices of peer devices.

In some embodiments, attenuation between wireless devices is determined. The attenuation is used to estimate signal strengths of signals generated by the HPR 450. (e.g. via Equation 1).

In some embodiments, a physical (e.g. geographic) location of wireless devices, along with signal strengths of HPR 450 generated signals, received at these wireless devices, are used to estimate a geographic position or location of the HPR 450 (e.g. via triangulation). Based on the estimated location of the HPR 450, some of the disclosed embodiments then estimate signal strengths of HPR 450 signals at the wireless devices. Those devices having signal strengths meeting a criterion (e.g. above a threshold) are then notified to include operating channels and/or frequencies of the HPR 450 on their respective blacklists (thus inhibiting operation of those devices on those operating channels).

Some embodiments determine, based on physical locations of wireless devices and signal strengths of the HPR 450 at those wireless devices to estimate a location of the HPR 450. In some embodiments, triangulation is used by relating signal strength to distance between HPR and respective AP. The estimated location of the HPR 450 is then used to estimate signal strengths of HPR 450 signals at other wireless devices. These signal strengths are evaluated against a second criterion (e.g. second predetermined threshold). If the estimated signal strengths meet the second criterion (e.g. are greater than the second predetermined threshold), the HPR 450 operating channels are added to the wireless device's blacklist, thus inhibiting operation by the wireless device on those operating channels.

Figure 5:
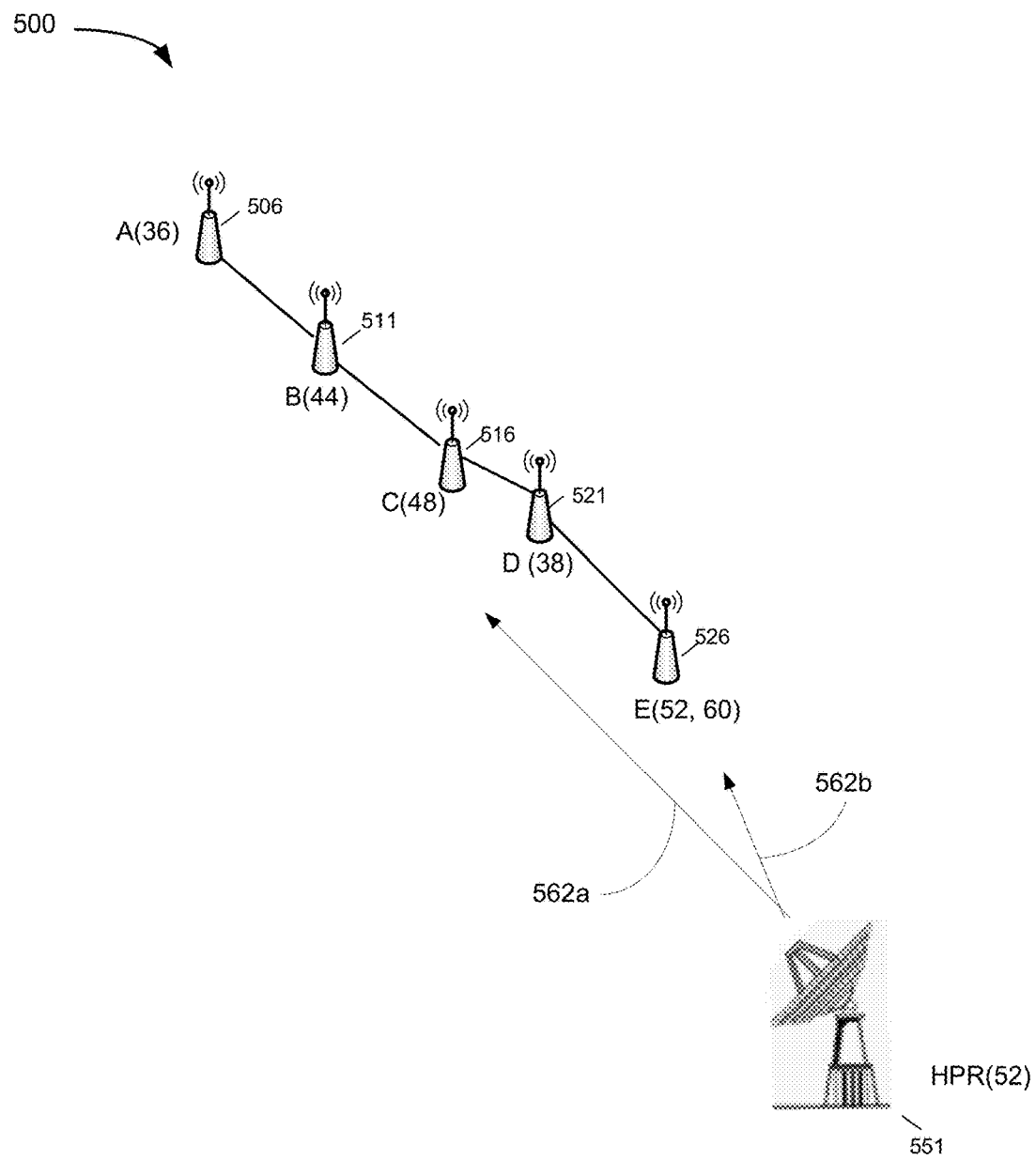
FIG. 5 is an example network graph 500 for a wireless network including a HPR 551.

FIG. 5 is an example network graph 500 for a wireless network including a HPR 551. The illustrated network includes nodes (e.g. APs) 506, 511, 516, 521, and 526 respectively. The nodes use Wi-Fi channels {36, 44, 48, 38, and 40} respectively. HPR 551 operates on channel 40. The HPR 551 is shown generating signals 562a-b.

In the embodiment illustrated by FIG. 5, the nodes are oriented on a substantially straight line. Node 526 initially operates on the same channel as the HPR 551 (e.g. channel 52). As such, the node 526 detects, in some embodiments, transmissions of the HPR. In response, node 526 switches to an alternate channel (e.g. channel 60). Node 526 provides a notification message (not shown) to the network management system (e.g. NMS 136) indicating the detection of HPR 551 transmissions on channel 52.

As discussed above, the network management system may use a variety of techniques in determining which wireless devices should include channels and/or frequencies of the HPR 551 on their blacklist (e.g. inhibit use of these channels). For example, in embodiments that notify peer devices, the network management system notifies node 521 since it is a first level peer of the node 526. Since node 516 is not notified to inhibit transmissions on channel 52, node 516 may later detect transmissions by HPR 551 and provide a second notification to the network management system.

Alternatively, node 516 operates, in some embodiments, on channel 48. The HPR 551 operates on both channels 52 and channel 48. Thus, while operating on channel 48, node 516 detects HPR transmissions and notifies the network management system. In this example embodiment, node 516 initiates a transition away from channel 48 to another channel. Channel 48 is included in a blacklist maintained by node 516. In the future AP 516 may need to switch to another channel and selects channel 40. Soon after the switch, in this example node 516 detects the operations of the HPR on channel 40. AP C switches to another operating channel, marks the channel in his blacklist and notifies the network management.

When nodes are on a substantially straight line as illustrated in FIG. 5, a direction and distance to the HPR 551 from the nodes can be determined based on estimated signal strength values of the HPR 551 at each of the nodes. If the estimated signal strength of the HPR 551 at node 506 and/or node 511 meets a criterion (e.g. smaller than a predetermined threshold), the operating frequency band of HPR 551 is not added to blacklists of nodes 506 and/or node 511 (at least in some embodiments).

Figure 6:
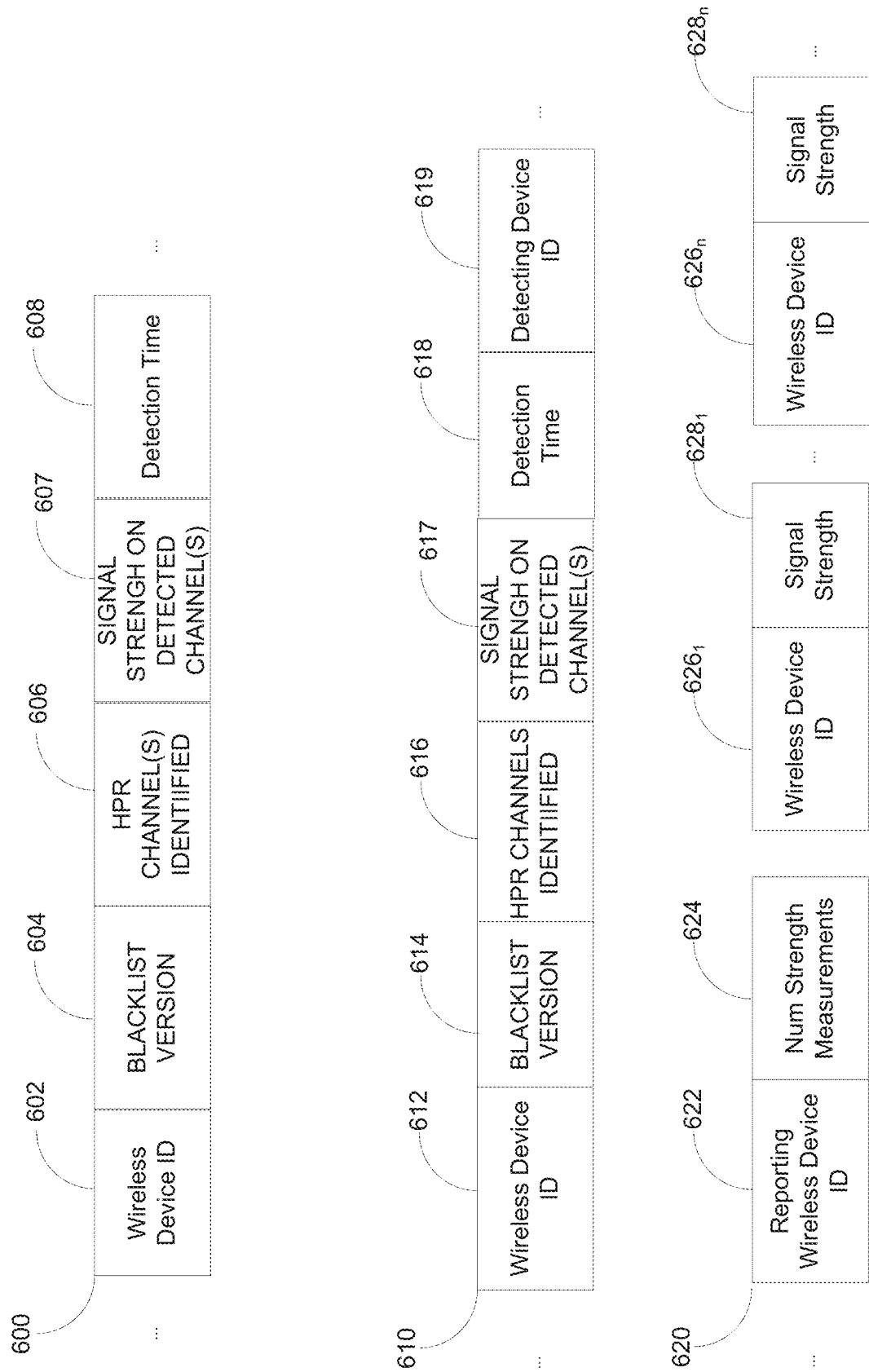
FIG. 6 shows example message portions which are implemented in one or more of the disclosed embodiments.

FIG. 6 shows example message portions which are implemented in one or more of the disclosed embodiments. FIG. 6 shows a first message portion 600 a second message portion 610, and a third message portion 620. The first message portion 600 is included, in some embodiments, in a notification message which is transmitted by a wireless device (e.g. an AP) to a network management system (e.g. NMS 136). The message portion 600 includes a wireless device identifier field 602, a blacklist version field 604, high priority receiver channel(s) field 606, a signal strength field 607, and a detection time field 608. The wireless device identifier field 602 identifies a device sending the notification message. The device identified via field 602 is, in some embodiments, a device that detected a high priority receiver. In some embodiments, the field 602 stores a station address of the identified wireless device. The blacklist version field 604 indicates a blacklist version stored by the wireless device sending the message. The blacklist version field 604 identifies, in some embodiments, a version of blacklist data provided by an NMS to the wireless device sending the message portion 600. This information is used, in some embodiments, by the NMS to determine whether to update the blacklist information of the wireless device. The high priority receiver channels field 606 identifies channels upon which the high priority receiver was detected to be transmitting on. The field 606 identifies specific frequency ranges (e.g. channels) of one or more channels in at least some aspects. The signal strength field 607 indicates signal strengths received from a transmitter associated with an HPR and detected on the channels identified via field 606. In some embodiments, the signal strength field 607 represents signal strengths via received signal strength indication (RSSI) values. The detection time field 608 indicates a time when the detection occurred. One or more fields of the example message portion 600 are included in a notification message sent by a wireless device to a network management system (e.g. NMS 136). In some embodiments, a wireless device is configured to send one or more fields of the message portion 600 upon detection of a transmitter associated with HPR.

Message portion 610 includes a wireless device identifier 612, blacklist version field 614, high priority receiver channels identified field 616, a signal strength field 617, a detection time field 618, and a detecting device identifier field 619. The wireless device identifier field 612 identifies a wireless device that is sending the message portion 610. The blacklist version field 614 indicates a version number to associate with blacklist information provided in the message portion 610. In some embodiments, the blacklist version field 614 is used to ensure wireless devices have the most up to date blacklist information from a NMS. For example, the wireless device provides, in some embodiments, the blacklist version information identifying a version of the blacklist maintained by the wireless device to a NMS. The NMS can then determine whether to update the wireless device with new blacklist information. The high priority receiver channels identified field 616 identifies channels upon which the HPR has been detected to operate. The signal strength field 617 identifies strengths of a signal received from a transmitter associated with an HPR and detected on the one or more channels indicated by field 616. In some embodiments, the signal strength field 617 represents signal strengths via received signal strength indication (RSSI) values. The detection time field 618 indicates when operation of HPR on the identified channels (e.g. via field 616) were detected. In some embodiments, an access point and/or NMS may delete a channel from a blacklist if the detection of operation of an HPR on a channel occurred more than a predetermined elapsed time prior to a current time. The detecting device identifier field 619 identifies a device that originally detected operation of an HPR on the channels identified via field 616. In some embodiments, the message portion 610 is included in a message that is transmitted by a network management system (e.g. NMS 136) to one or more wireless devices. The message portion 610 functions to notify receiving wireless devices of the presence of the identified HPR and that devices receiving the notification are to avoid operation on the channels identified via field 616 (at least until the time indicated by the expiration time field 618 in some embodiments).

Message portion 620 functions to provide signal strength measurement information to a network management system (e.g. NMS 136) from a wireless device (e.g. any of the APs 142, 144, 150, or 152 discussed above with respect to FIG. 1). The message portion 620 includes a reporting wireless device identifier field 622, and a number of strength measurements field 624. The reporting wireless device identifier field 622 identifies a device generating the message portion 620. The field 622 also identifies, in some embodiments, the device performing measurement of signal strengths reported by the message portion 620. The number of strength measurements field 624 indicates a number of signal strength measurements conveyed by the message portion 620. The signal strength measurements are conveyed via pairs of fields, as shown in FIG. 6. These pairs may be repeated in the message portion 620 a number of times as indicated by the number of strength measurements field 624. Each of the wireless device identifier fields $626_1 \ldots 626_n$ identify a device from which a signal was generated, and was measured by the device identified via field 622. Each of signal strength measurement fields $628_1 \ldots 628_n$ identifies a signal strength measurement of the signal on the respective channel. In some embodiments, the signal strength field(s) $628_{1 \ldots n}$ identify a received signal strength indication (RSSI). In some embodiments, one or more of the fields included in the message portion 620 are transmitted by a particular wireless device to a network management system (e.g. NMS 136) to report strength of signals transmitted by other wireless devices and received by the particular wireless device.

Figure 7:
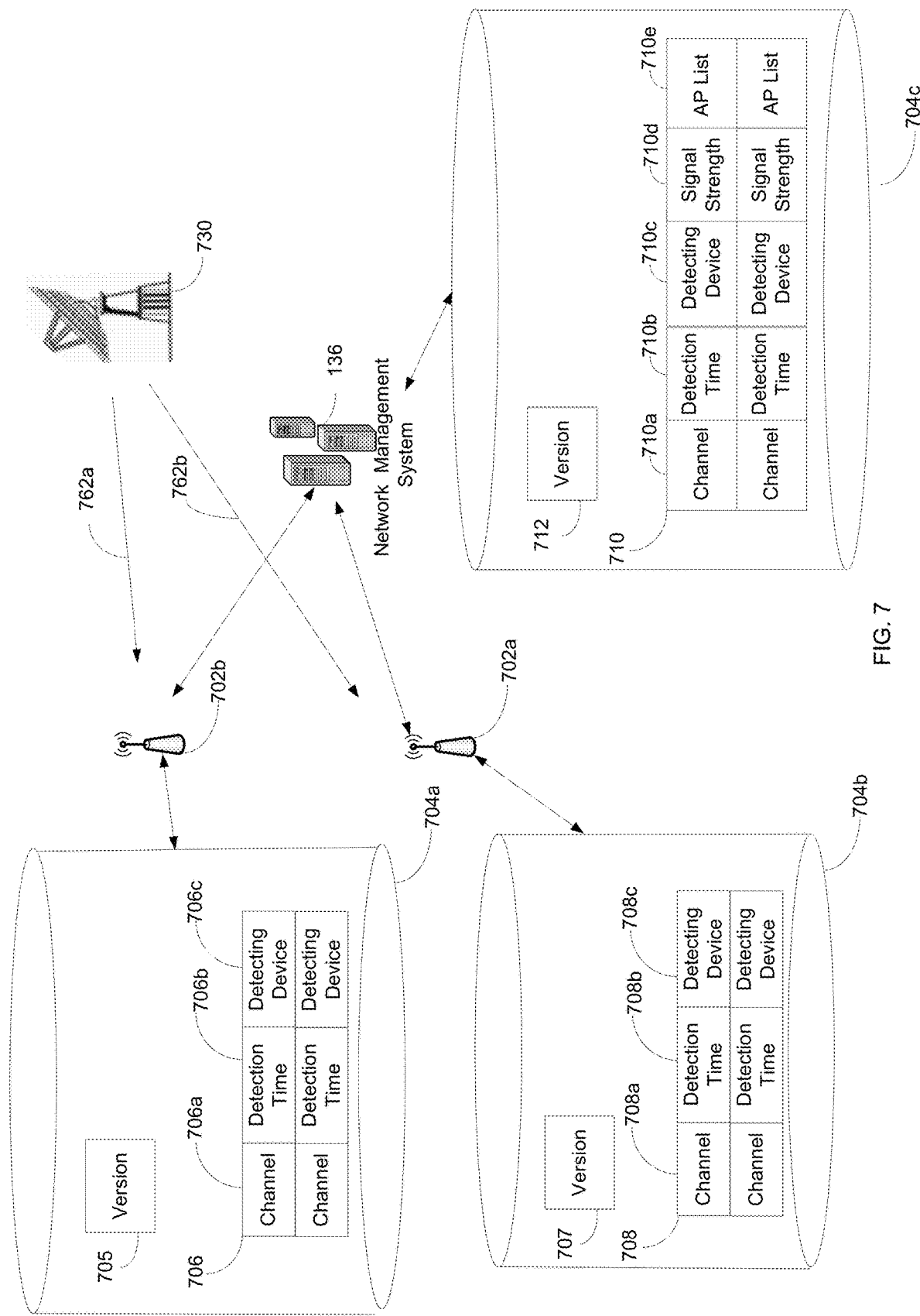
FIG. 7 is an overview diagram showing example blacklists maintained by wireless devices.

FIG. 7 is an overview diagram showing example blacklists maintained by wireless devices in at least some of the disclosed embodiments. FIG. 7 shows two wireless devices 702*a-b* and a network management system 136. Each of the wireless devices 702*a-b* maintains an AP blacklist 706 and an AP blacklist 708 respectively. Version identification 705 and 707 are maintained for each of the AP blacklist 706 and AP blacklist 708 respectively. Each of the AP blacklists 706 and the AP blacklist 708 are stored in data stores 704*a* and 704*b*respectively. In some embodiments, the network management system 136 also stores an NMS blacklist 710 in a data store 704*c*. Each of the AP blacklist 706 and AP blacklist 708 include at least, in some embodiments, channel information (e.g. channel information 706a, channel information 708a) and detection time information (e.g. detection time information 706b, and detection time information 708b). Each of the AP blacklist 706 and AP blacklist 708 also stores information identifying a device that detected an HPR operating on a channel identified by the AP blacklist (e.g. 706c and 708c).

The NMS blacklist 710 stores the blacklist version information 712 and information that allows it to customize a blacklist for each AP managed by the NMS 136. Thus, in the illustrated embodiment, the NMS blacklist 710 includes channel information 710a, detection time information 710b of an HPR operating on channel(s) indicated by 710a, a device detecting the HPR operating on said channels 710c, signal strength (e.g. RSSI) of said signals at said device 710d, and an AP list 710e. The AP list 710e identifies zero or more access points that are instructed not to operate on the one or more channels indicated by channel information 710a. The detection time information 710b is used, in some embodiments, to remove prohibitions from operating on particular channels. For example, if no HPR is detected on a channel for more than a predetermined threshold period of time, APs may be notified that they are now permitted to attempt to operate on the channel. When data in the NMS blacklist 710 is updated, the NMS increments the blacklist version information 712. The blacklist version information 712 is provided in messages transmitted to the APs 702a-b to provide an ability to synchronize blacklist information across the NMS and the APs.

In some embodiments, the network management system 136 sends messages to one or more of the wireless devices 702a-b to add or remove channels used by HPR from AP blacklist 706 and/or AP blacklist 708 respectively. For example, as discussed above, in some embodiments, the network management system 136 transmits one or more fields of the message portion 610 to one or more of the wireless devices 702a-b to add or remove HPR operating channels (e.g. via field 616) to the wireless device's AP blacklist (e.g. 706 and/or 708). The NMS blacklist 710 stores HPR information that has been collected and/or determined by the network management system 136. In some embodiments, the network management system 136 is configured to transmit information derived from the NMS blacklist 710 to wireless devices under management by the network management system 136.

Figure 8:
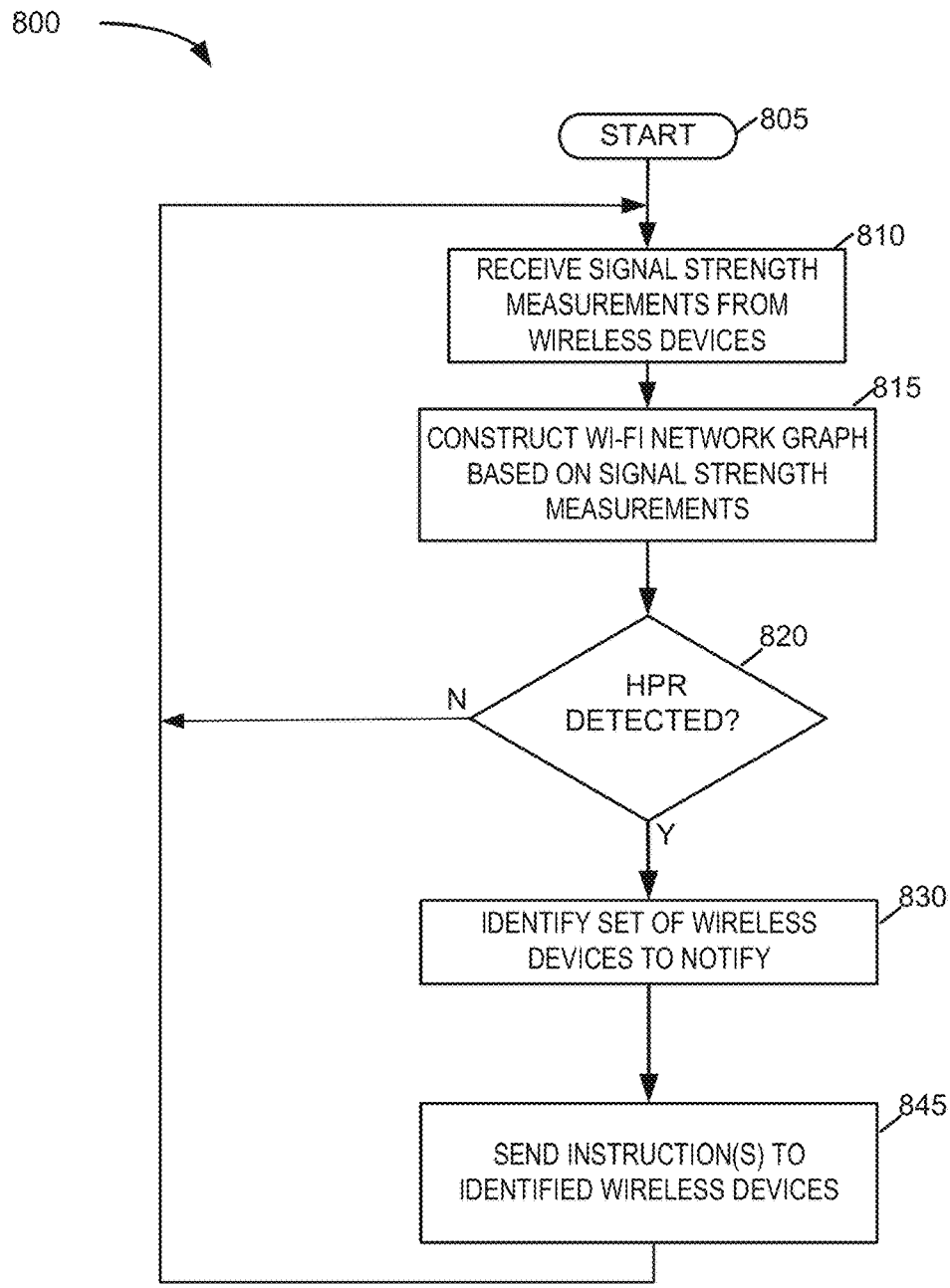
FIG. 8 is a flowchart of an example process for managing transmission of a plurality of wireless devices so as to prevent interference with one or more high priority receivers.

FIG. 8 is a flowchart of an example process for managing transmission of a plurality of wireless devices so as to prevent interference with one or more high priority receivers. In some embodiments, one or more of the functions discussed below with respect to FIG. 8 are performed by hardware processing circuitry (e.g. 206, 306). In some aspects, instructions (e.g. 214, 314) stored in a memory (e.g. 212, 312) configure the hardware processing circuitry to perform one or more of the functions discussed below with respect to FIG. 8. In some embodiments, the process 800 is performed by the network management system 136, discussed above with respect to FIG. 1. In the discussion below, a device executing the process 800 is referred to as an "executing device."

After start operation 805, the process 800 moves to operation 810, where signal strength measurements are received from wireless devices. As discussed above, in some embodiments wireless devices on a wireless network, such as any of the APs 142, 144, 150, or 152 discussed above with respect to FIG. 1 or the wireless device 702a and wireless device 702b discussed above with respect to FIG. 7 report signal strength measurements to a network management system (e.g. NMS 136). In some embodiments, the wireless devices filter signal strength measurements such that only those signal strength measurements above a threshold are provided and thus received in operation 810. In some embodiments, operation 810 includes receiving one or more of the message portion 620, discussed above with respect to FIG. 6. The message portions 620 convey the signal strength information by wireless devices to the executing device (e.g. a network management system such as NMS 136).

In operation 815, a network graph is constructed based on the signal strength measurements. As discussed above, the network graph is constructed, in some embodiments, to represent devices providing signal strength measurements as nodes in the graph, with the signal strength measurements represented as edges in the graph. Thus, if a first wireless device measured a signal from a second wireless device, an edge in the graph would connect a node representing the first wireless device to a second node representing the second wireless device. The signal strength would be stored in association with the edge. As discussed below, some embodiments use the network graph to determine which wireless devices are affected by high priority receivers. Some embodiments may not generate a network graph, but make a determination as to which wireless devices are affected by a high priority receiver using other types of data structures and/or processing methods.

Decision operation 820 determines whether a high priority receiver has been detected. For example, in some embodiments, decision operation 820 determines if a message similar to message portion 600, discussed above with respect to FIG. 6, is received. The message is received from a notifying device. Message portion 600 provides an example message which functions as a notification of detection of a transmitter associated with a high priority receiver. The notification can be received from a wireless device included in a wireless network, such as any of the APs 142, 144, 150, or 152 discussed above with respect to FIG. 1 and/or any of the wireless device 702a or wireless device 702b discussed above with respect to FIG. 7. The notification identifies a set of channels upon which operation of a high priority receiver device has been detected. The set of channels can indicate one or more channels. If no notification is received, the process 800 returns to operation 810. Otherwise, if a notification has been received, the process 800 moves to operation 830 which determines which wireless devices are to be notified about the high priority receiver.

Operation 830 identifies a set of wireless devices utilizing a variety of methods in various embodiments. In some embodiments, operation 830 identifies all wireless devices being managed by the executing device. In some embodiments, operation 830 identifies all access points being managed by the executing device. For example, with respect to FIG. 7, the network management server identifies each of the wireless device 702a and the wireless device 702b. With respect to FIG. 1, the network management system 136 identifies each of APs 142, 144, 150, or 152.

In some other embodiments, operation 830 identifies peer devices of the detecting device from which the notification was received (the notifying device discussed above). Peer devices of a subject device are devices, in at least some embodiments directly connected by a single edge of the network graph to the subject device. In some embodiments, peer devices are connected to the subject device via a predetermined number of edges (which can be one, two, three, four, five, or more edges in various embodiments).

These peer devices are then included in the set of wireless devices. As discussed above with respect to FIG. 4, APs 425, 435, 410, and 405 are peer devices of AP 430, as these APs receive signals generated by the AP 430, and/or AP 430 receives signals from APs 425, 435, 410, and 405 (and/or those signals are above a threshold that qualifies the devices as peer devices). Note that since AP 415, for example, is not connected via the network graph 400 of FIG. 4 with AP 430, AP 415 is not a peer device of AP 430. Similarly, since AP 420, is not connected via the network graph 400 of FIG. 4 with AP 405, AP 410, or AP 430, AP 420 is not a peer device of these APs. Some embodiments of operation 830 identify peer devices at a first, second, third, or fourth level. (e.g. peer devices of peer devices would be second level peer devices, etc.).

In another embodiment, operation 830 identifies the set of wireless devices with estimated signal strength of HPR signals above a predetermined threshold. In some embodiments, this estimate is made by first determining an estimated geographic location of the HPR and then estimating its signal strength at locations of the wireless devices (e.g. the plurality of wireless devices providing signal strength measurement information in operation 810). The geographic location of the HPR is determined, in some aspects, by triangulating signals received by the HPR across multiple wireless devices (e.g. signals received by the wireless device 702a and wireless device 702b that are generated by HPR 730 (e.g. signals 762a and 762b) are used to estimate a location of the HPR 730).

Based on the estimated geographic location of the HPR, and, in some embodiments, the network graph generated in operation 815, estimates of signal strength values of HPR signals at wireless devices included in the plurality of wireless devices are determined. If the estimated signal strength at a particular device is above a threshold or otherwise meets a criterion, that particular device is included in a subset of the plurality of wireless devices. The wireless devices included in the subset are then included in the identified set of wireless devices by operation 830.

In some embodiments, wireless devices are included in the subset based on a geographic distance determined between a device detecting the HPR or an estimated position of the HPR and each of the respective devices. In these embodiments, wireless devices having a distance less than a predetermined threshold value from the detecting device and/or the HPR estimated location are identified, and the identified wireless devices are included in the set of wireless devices of operation 830.

In some embodiments, a network graph is utilized to identify devices to notify. For example, the network graph is utilized, in some embodiments, to identify communication paths between devices having signal attenuation meeting a criterion. For example, in some embodiments, the criterion evaluates whether attenuation between the detecting device and a particular candidate device is smaller than a predetermined threshold. Candidate devices meeting the criterion are then notified in these embodiments. Thus wireless devices are included in the subset based on their respective attenuation with the detecting device. This identified subset of devices having attention meeting the criterion are then added to the set of wireless devices.

In operation 845, instructions are sent to the set of wireless devices identified in operation 830. The instructions generally indicate to wireless devices in the subset to avoid operation on any channels detected to be in use by the detected HPR. In some embodiments, the executing device transmits one or more fields of message portion 610 to each of the wireless devices included in the set of wireless devices in operation 830. In some embodiments, operation 845 adds the channel information relating to the identified HPR to a NMS blacklist (e.g. 710). The NMS blacklist is used, in some embodiments, to initialize AP blacklists (e.g. 706 and/or 708) of other wireless devices. For example, if new wireless devices are added to the network, or an existing device is reinitialized, a network management system (e.g. NMS 136) utilizes the NMS blacklist to initialize the local blacklist of the new or reset device.

Figure 9:
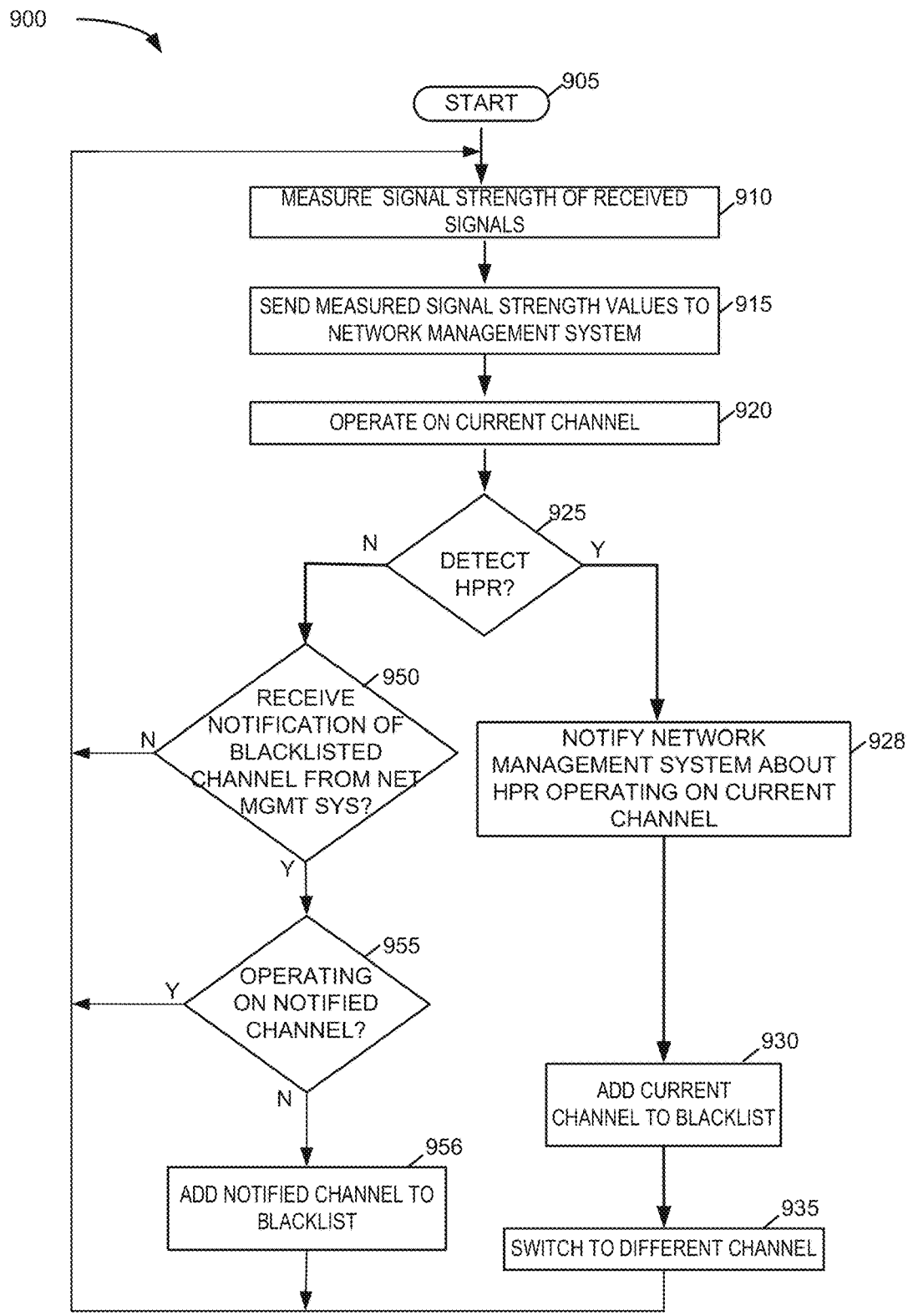
FIG. 9 is a flowchart of an example process for avoiding interference with a high priority receiver.

FIG. 9 is a flowchart of an example process for avoiding interference with a high priority receiver. In some embodiments, the process 900 discussed below with respect to FIG. 9 is performed by a wireless device, such as any of the APs 142, 144, 150, or 152 of FIG. 1 or the wireless device 702a and/or the wireless device 702b discussed above with respect to FIG. 7. In some embodiments, instructions (e.g. routines 214) stored in a memory (E.g. 212) configure hardware processing circuitry (e.g. 206) to perform one or more of the functions discussed below with respect to FIG. 9 and the process 900. In the discussion below, a device performing the process 900 is referred to, in some cases, as the "executing device."

In some embodiments, one or more of the functions discussed below with respect to FIG. 9 are performed by hardware processing circuitry (e.g. 206, 306). In some aspects, instructions (e.g. 214, 314) stored in a memory (e.g. 212, 312) configure the hardware processing circuitry to perform one or more of the functions discussed below with respect to FIG. 9. In some embodiments, the process 900 is performed by the network management system 136, discussed above with respect to FIG. 1. A device executing or performing the process 900 is referenced below as an "executing device."

Process 900 begins at start operation 905 and then moves to operation 910. In operation 910 signal strength measurements of signals received by the executing device are performed. In some embodiments, the signal strength measurements are represented as received signal strength indications (RSSIs). The signals are generated by other wireless devices, such as neighboring APs or high priority receivers.

In operation 915, the signal strength measurements are transmitted to a network management system (e.g. NMS 136). For example, as discussed above with respect to FIG. 6, some embodiments generate the message portion 620 to communicate signal strength measurements from a wireless device to a network management system.

In operation 920, the executing device operates on a current channel. Operating on the current channel includes communicating with other devices (e.g. wireless terminals associated with the executing device) on the current channel. Decision operation 925 determines whether a transmitter associated with a high priority receiver has been detected. If no high priority receiver has been detected, process 900 moves to decision operation 950. Decision operation 950 determines whether a notification has been received. The notification functions to notify the executing device of a channel that is conditionally subject to blacklisting. This channel is referred to as a notified channel. In some embodiments, the notification includes the message portion 610. The notification is received, in some embodiments, from a network management system (e.g. NMS 136). If no notification is received, process 900 returns to operation 910. If a notification is received, process 900 moves from decision operation 950 to decision operation 955, which determines if the executing device is currently operating on the notified channel included in the received notification. If the executing device is currently operating on the notified channel, some embodiments determine that continued operation on the notified channel is acceptable, since the AP has not detected operation of the HPR on the notified channel. Such implementations operate in a manner that preferences local determinations (e.g. by the executing device) of possible interference to determinations of possible interference by an NMS. If the executing device is not operating on the notified channel, process 900 moves from decision operation 955 to operation 956, which adds the notified channel to the blacklist. After operation 956 completes, processing returns to operation 910. If the executing device is operating on the notified channel, the notification is effectively ignored, and processing moves from decision operation 955 to operation 910.

Returning to decision operation 925, if a high priority receiver is identified, process 900 moves from decision operation 925 to operation 928, which notifies a network management system of the detected HPR. In some embodiments, process 900 generates a message portion 600, indicating parameters of the HPR. The message portion 600 is then transmitted to the network management system (e.g. NMS 136). The process 900 then moves to operation 930 which includes the current channel on a blacklist. By adding the current channel to the blacklist, operation on the current channel is inhibited. Process 900 then moves to operation 935, which switches operation of the executing device to a different channel. Processing then optionally returns to operation 910.

In some embodiments of FIG. 9 and the process 900, an AP can become constrained with respect to channels upon which it may operate. For example, in certain environments, an AP can be blacklisted from operating on a first set of channels where a HPR has been determined to be operating. HPR operation on this first set of channels is detected by the AP itself. The AP can be further blacklisted from operating on a second set of channels. HPR operation on this second set of channels is detected by other wireless devices, such as other access points. The AP was notified of this second set of blacklisted channels via an NMS, at least in some embodiments. Thus, the AP's operational environment is constrained. In some cases, these constraints may inhibit a reasonable level of performance by the AP. For example, in some operational environments, none of the available channels, that are not in the blacklist, have sufficient quality to enable nominal operation. Thus, there is an absence of available channels sufficient to maintain nominal operation.

In an attempt to maintain nominal operation is such an environment, APs are configured, in some embodiments, to attempt operation on a channel identified in the blacklist. In some embodiments, communication is attempted first on any blacklisted channels communicated to the wireless device by the NMS. For those channels, an HPR was most likely detected via a different AP, and not the AP attempting the communication. Thus, there is a higher likelihood that the AP can operate successfully on the blacklisted channel due to inefficiencies in the blacklisting algorithms that determine which AP should be blacklisted from which channels. If none of the NMS identified channels can be used (e.g. after attempting communication, HPR communication prohibiting operation is detected), some of the AP's are configured to then attempt communication on channels previously blacklisted by the AP itself.

The techniques of various embodiments may be implemented using software, hardware and/or a combination of software and hardware. Various embodiments are directed to apparatus, e.g., management entities, e.g., a network monitoring node, routers, gateways, switches, APs, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an AP, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of approaches that may be used in one or more of the disclosed embodiments. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an AP, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a method, comprising: receiving signal strength measurements of signals generated by a plurality of wireless devices of a wireless network; receiving, from a wireless device of the plurality of wireless devices, a notification of a detection of a high priority receiver (HPR), the notification indicating a channel on which the HPR was detected; determining, based on the signal strength measurements and the notification, a set of wireless devices; and transmitting, to the set of wireless devices, instructions to avoid operation on the channel.

In Example 2, the subject matter of Example 1 optionally includes generating a network graph based on the signal strength measurements, wherein the determining of the set of wireless devices is based on the network graph.

In Example 3, the subject matter of any one or more of Examples 1-2 optionally include wherein the determining of the set of wireless devices comprises determining an attenuation between each of a plurality of wireless devices and the wireless device, and conditionally including each of the plurality of wireless devices in the set of wireless devices based on the respective attenuation.

In Example 4, the subject matter of any one or more of Examples 1-3 optionally include wherein determining the set of wireless devices comprises including all wireless devices included in the wireless network in the set of wireless devices.

In Example 5, the subject matter of any one or more of Examples 1-4 optionally include wherein determining the set of wireless devices comprises estimating a geographic location of the HPR, identifying wireless devices within a predetermined proximity of the geographic location, and including the identified wireless devices in the set of wireless devices.

In Example 6, the subject matter of Example 5 optionally includes wherein estimating a geographic location of the high priority receiver is based on a plurality of signal strength measurements of signals generated by the HPR, the signal strength measurements by wireless devices of the plurality of wireless devices.

In Example 7, the subject matter of any one or more of Examples 1-6 optionally include wherein determining the set of wireless devices comprises estimating, based on the signal strength measurements, a signal strength of the HPR at each wireless device in the plurality of wireless devices, identifying a subset of the plurality of wireless devices having an estimated signal strength of the HPR that meets a criterion, and adding the identified subset of wireless devices to the set of wireless devices.

In Example 8, the subject matter of any one or more of Examples 1-7 optionally include detecting an initialization of an access point; and transmitting blacklist information to the access point in response to the detecting.

Example 9 is a method, comprising: detecting, by an access point, operation of a high priority receiver on a first channel; transmitting, by the access point, a message to a network management system indicating the detection; adding, by the access point, the first channel to a blacklist indicating, in the blacklist, the first channel was detected by the access point; and switching, by the access point, communication to a second channel based on the detecting.

In Example 10, the subject matter of Example 9 optionally includes communicating over the second channel; receiving, by the access point, from the network management system, a first message indicating communication on the second channel are to be avoided; and inhibiting an addition of the second channel to the blacklist based on the communicating over the second channel.

In Example 11, the subject matter of Example 10 optionally includes receiving, by the access point, from the network management system, a second message indicating an additional channel upon which to avoid communications; adding the additional channel to the blacklist in response to the access point operating on a different channel when the second message is received; indicating, in the blacklist, the additional channel was not detected by the access point; and inhibiting operation on the additional channel based on the additional channel being on the blacklist.

In Example 12, the subject matter of Example 11 optionally includes detecting, an absence of available channels; and in response to the detecting, attempting communication on a channel on the blacklist that was not detected by the access point before attempting communication on a second channel detected by the access point.

In Example 13, the subject matter of any one or more of Examples 9-12 optionally include determining a predetermined elapsed time has elapsed since operation of the high priority receiver was detected, and removing the first channel from the blacklist in response to the determining.

Example 14 is a system, comprising: hardware processing circuitry; one or more hardware memories storing instructions that when executed configure the hardware processing circuitry to perform operations comprising: receiving signal strength measurements of signals generated by a plurality of wireless devices of a wireless network; receiving, from a wireless device of the plurality of wireless devices, a notification of a detection of a high priority receiver (HPR), the notification indicating a channel on which the HPR was detected; determining, based on the signal strength measurements and the notification, a set of wireless devices; and transmitting, to the set of wireless devices, instructions to avoid operation on the channel.

In Example 15, the subject matter of Example 14 optionally includes the operations the operations further comprising generating a network graph based on the signal strength measurements, wherein the determining of the set of wireless devices is based on the network graph.

In Example 16, the subject matter of any one or more of Examples 14-15 optionally include wherein the determining of the set of wireless devices comprises determining an attenuation between each of a plurality of wireless devices and the wireless device, and conditionally including each of the plurality of wireless devices in the set of wireless devices based on the respective attenuation.

In Example 17, the subject matter of any one or more of Examples 14-16 optionally include wherein determining the set of wireless devices comprises including all wireless devices included in the wireless network in the set of wireless devices.

In Example 18, the subject matter of any one or more of Examples 14-17 optionally include wherein determining the set of wireless devices comprises estimating a geographic location of the HPR, identifying wireless devices within a predetermined proximity of the geographic location, and including the identified wireless devices in the set of wireless devices.

In Example 19, the subject matter of any one or more of Examples 5-18 optionally include wherein estimating a geographic location of the high priority receiver is based on a plurality of signal strength measurements of signals generated by the HPR, the signal strength measurements by wireless devices of the plurality of wireless devices.

In Example 20, the subject matter of any one or more of Examples 14-19 optionally include wherein determining the set of wireless devices comprises estimating, based on the signal strength measurements, a signal strength of the HPR at each wireless device in the plurality of wireless devices, identifying a subset of the plurality of wireless devices having an estimated signal strength of the HPR that meets a criterion, and adding the identified subset of wireless devices to the set of wireless devices.

In Example 21, the subject matter of any one or more of Examples 14-20 optionally include the operations further comprising: detecting an initialization of an access point; and transmitting blacklist information to the access point in response to the detecting.

Example 22 is a system, comprising: hardware processing circuitry; one or more hardware memories storing instructions that when executed configure the hardware processing circuitry to perform operations comprising: detecting, by an access point, operation of a high priority receiver on a first channel; transmitting, by the access point, a message to a network management system indicating the detection; adding, by the access point, the first channel to a blacklist indicating, in the blacklist, the first channel was detected by the access point; and switching, by the access point, communication to a second channel based on the detecting.

In Example 23, the subject matter of Example 22 optionally includes the operations further comprising: communicating over the second channel; receiving, by the access point, from the network management system, a first message indicating communication on the second channel are to be avoided; and inhibiting an addition of the second channel to the blacklist based on the communicating over the second channel.

In Example 24, the subject matter of Example 23 optionally includes the operations further comprising: receiving, by the access point, from the network management system, a second message indicating an additional channel upon which to avoid communications; adding the additional channel to the blacklist in response to the access point operating on a different channel when the second message is received; indicating, in the blacklist, the additional channel was not detected by the access point; and inhibiting operation on the additional channel based on the additional channel being on the blacklist.

In Example 25, the subject matter of Example 24 optionally includes the operations further comprising: detecting, an absence of available channels; and in response to the detecting, attempting communication on a channel on the blacklist that was not detected by the access point before attempting communication on a second channel detected by the access point.

In Example 26, the subject matter of any one or more of Examples 22-25 optionally include the operations further comprising: determining a predetermined elapsed time has elapsed since operation of the high priority receiver was detected, and removing the first channel from the blacklist in response to the determining.

Example 27 is a non-transitory computer readable storage medium comprising instructions that when executed configure hardware processing circuitry to perform operations comprising: receiving signal strength measurements of signals generated by a plurality of wireless devices of a wireless network; receiving, from a wireless device of the plurality of wireless devices, a notification of a detection of a high priority receiver (HPR), the notification indicating a channel on which the HPR was detected; determining, based on the signal strength measurements and the notification, a set of wireless devices; and transmitting, to the set of wireless devices, instructions to avoid operation on the channel.

In Example 28, the subject matter of Example 27 optionally includes the operations the operations further comprising generating a network graph based on the signal strength measurements, wherein the determining of the set of wireless devices is based on the network graph.

In Example 29, the subject matter of any one or more of Examples 27-28 optionally include wherein the determining of the set of wireless devices comprises determining an attenuation between each of a plurality of wireless devices and the wireless device, and conditionally including each of the plurality of wireless devices in the set of wireless devices based on the respective attenuation.

In Example 30, the subject matter of any one or more of Examples 27-29 optionally include wherein determining the set of wireless devices comprises including all wireless devices included in the wireless network in the set of wireless devices.

In Example 31, the subject matter of any one or more of Examples 27-30 optionally include wherein determining the set of wireless devices comprises estimating a geographic location of the HPR, identifying wireless devices within a predetermined proximity of the geographic location, and including the identified wireless devices in the set of wireless devices.

In Example 32, the subject matter of Example 31 optionally includes wherein estimating a geographic location of the high priority receiver is based on a plurality of signal strength measurements of signals generated by the HPR, the signal strength measurements by wireless devices of the plurality of wireless devices.

In Example 33, the subject matter of any one or more of Examples 27-32 optionally include wherein determining the set of wireless devices comprises estimating, based on the signal strength measurements, a signal strength of the HPR at each wireless device in the plurality of wireless devices, identifying a subset of the plurality of wireless devices having an estimated signal strength of the HPR that meets a criterion, and adding the identified subset of wireless devices to the set of wireless devices.

In Example 34, the subject matter of any one or more of Examples 27-33 optionally include the operations further comprising: detecting an initialization of an access point; and transmitting blacklist information to the access point in response to the detecting.

Example 35 is a non-transitory computer readable storage medium comprising instructions that when executed configure hardware processing circuitry to perform operations comprising: detecting, by an access point, operation of a high priority receiver on a first channel; transmitting, by the access point, a message to a network management system indicating the detection; adding, by the access point, the first channel to a blacklist indicating, in the blacklist, the first channel was detected by the access point; and switching, by the access point, communication to a second channel based on the detecting.

In Example 36, the subject matter of Example 35 optionally includes the operations further comprising: communicating over the second channel; receiving, by the access point, from the network management system, a first message indicating communication on the second channel are to be avoided; and inhibiting an addition of the second channel to the blacklist based on the communicating over the second channel.

In Example 37, the subject matter of any one or more of Examples 35-36 optionally include the operations further comprising: receiving, by the access point, from the network management system, a second message indicating an additional channel upon which to avoid communications; adding the additional channel to the blacklist in response to the access point operating on a different channel when the second message is received; indicating, in the blacklist, the additional channel was not detected by the access point; and inhibiting operation on the additional channel based on the additional channel being on the blacklist.

In Example 38, the subject matter of any one or more of Examples 35-37 optionally include the operations further comprising: detecting, an absence of available channels; and in response to the detecting, attempting communication on a channel on the blacklist that was not detected by the access point before attempting communication on a second channel detected by the access point.

In Example 39, the subject matter of any one or more of Examples 35-38 optionally include the operations further comprising: determining a predetermined elapsed time has elapsed since operation of the high priority receiver was detected, and removing the first channel from the blacklist in response to the determining.

In Example 40, an access point includes a wireless interface, hardware processing circuitry, and one or more hardware memories storing instructions that when executed configure the hardware processing circuitry to perform operations. The operations include receiving signals via the wireless interface, detecting operation of a high priority receiver on a first channel based on the received signals, transmitting a message to a network management system indicating the detection, adding the first channel to a blacklist, indicating, in the blacklist, the first channel was detected by the access point; and switching communication to a second channel based on the detecting.

In Example 41, the subject matter of Example 40 optionally include additional operations including communicating over the second channel, receiving from the network management system, via the wireless interface, a first message indicating communication on the second channel are to be avoided, and inhibiting an addition of the second channel to the blacklist based on the communicating over the second channel.

In Example 42, the subject matter of Examples 40-41 optionally include additional operations including receiving from the network management system, via the wireless interface, a second message indicating an additional channel upon which to avoid communications, adding the additional channel to the blacklist in response to the access point operating on a different channel when the second message is received, indicating, in the blacklist, the additional channel was not detected by the access point; and inhibiting operation on the additional channel based on the additional channel being on the blacklist.

In Example 43, the subject matter of Examples 40-42 optionally include detecting, an absence of available channels; and in response to the detecting, attempting communication on a channel on the blacklist that was not detected by the access point before attempting communication on a second channel detected by the access point.

In Example 44, the subject matter of Examples 40-43 optionally include determining a predetermined elapsed time has elapsed since operation of the high priority receiver was detected, and removing the first channel from the blacklist in response to the determining.

The invention claimed is:

1. A method, comprising:
receiving, from a first wireless device of a plurality of wireless devices of a wireless network, a notification of a detection of a high priority receiver (HPR), the notification indicating a channel on which the HPR was detected;
estimating a geographic location of the HPR;
determining, based on received signal strength measurements of signals generated by the plurality of wireless devices of a wireless network, an attenuation between each of the plurality of wireless devices and the first wireless device;
identifying, based on the attenuation between each of the plurality of wireless devices and the first wireless device, one or more wireless devices of the plurality of wireless devices within a predetermined proximity of the geographic location of the HPR; and
providing a notification including instructions to avoid operation on the channel to the one or more wireless devices within the predetermined proximity of the geographic location of the HPR.

2. The method of claim 1, further comprising generating a network graph based on the signal strength measurements, wherein identifying one or more wireless devices of the plurality of wireless devices within a predetermined proximity of the geographic location of the HPR is based on the network graph.

3. The method of claim 1, wherein identifying one or more wireless devices of the plurality of wireless devices within a predetermined proximity of the geographic location of the HPR further includes:
comparing the attenuation between each of the plurality of wireless devices and the first wireless device to the predetermined threshold.

4. The method of claim 1, wherein estimating a geographic location of the HPR is based on a plurality of signal strength measurements of signals generated by the HPR, the signal strength measurements by wireless devices of the plurality of wireless devices.

5. The method of claim 1, wherein identifying one or more wireless devices of the plurality of wireless devices within a predetermined proximity of the geographic location of the HPR comprises estimating, based on the signal strength measurements, a signal strength of the HPR at each wireless device of the plurality of wireless devices, and identifying a subset of the plurality of wireless devices having an estimated signal strength of the HPR that meets a criterion.

6. The method of claim 5, further comprising:
detecting, by the first wireless device, an absence of available channels; and
in response to the detecting, attempting, by the first wireless device, communication on a channel on a blacklist that was not detected by the first wireless device before attempting communication on a second channel detected by the first wireless device.

7. The method of claim 1, the operations further comprising:
determining a predetermined elapsed time has elapsed since operation of the HPR was detected, and removing the first channel from a blacklist in response to the determining.

8. A system, comprising:
hardware processing circuitry;
one or more hardware memories storing instructions that when executed configure the hardware processing circuitry to perform operations comprising:
receiving, from a first wireless device of a plurality of wireless devices of a wireless network, a notification of a detection of a high priority receiver (HPR), the notification indicating a channel on which the HPR was detected;
estimating a geographic location of the HPR;
determining, based on received signal strength measurements of signals generated by the plurality of wireless devices of a wireless network, an attenuation between each of the plurality of wireless devices and the first wireless device;
identifying, based on the attenuation between each of the plurality of wireless devices and the first wireless device, one or more wireless devices of the plurality of wireless devices within a predetermined proximity of the geographic location of the HPR; and
providing a notification including instructions to avoid operation on the channel to the one or more wireless devices within the predetermined proximity of the geographic location of the HPR.

9. The system of claim 8, the operations further comprising generating a network graph based on the signal strength measurements, wherein identifying one or more wireless devices of the plurality of wireless devices within a predetermined proximity of the geographic location of the HPR is based on the network graph.

10. The system of claim 8, wherein identifying one or more wireless devices of the plurality of wireless devices within a predetermined proximity of the geographic location of the HPR further includes:
comparing the attenuation between each of the plurality of wireless devices and the first wireless device to a predetermined threshold; and
identifying the set of the plurality of wireless devices based on whether the respective attenuation satisfies the predetermined threshold.

11. The system of claim 8, wherein estimating a geographic location of the HPR is based on a plurality of signal strength measurements of signals generated by the HPR, the signal strength measurements by wireless devices of the plurality of wireless devices.

12. The system of claim 8, wherein identifying one or more wireless devices of the plurality of wireless devices within a predetermined proximity of the geographic location of the HPR further includes estimating, based on the signal strength measurements, a signal strength of the HPR at each wireless device of the plurality of wireless devices, identifying a subset of the plurality of wireless devices having an estimated signal strength of the HPR that meets a criterion, and adding the identified subset of wireless devices to the set of wireless devices.

13. The system of claim 8, wherein the plurality of wireless devices includes a plurality of access points, the operations further comprising:
detecting an initialization of an access point of the plurality of access points; and
transmitting blacklist information including a notification indicating the channel on which the HPR was detected to the access point in response to the detecting.

* * * * *